Patented Aug. 11, 1931

1,818,888

UNITED STATES PATENT OFFICE

KARL FRANK AND KARL DIETZ, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR PREPARING ACID-PROOF CEMENTING OR LINING COMPOSITIONS

No Drawing. Application filed September 8, 1926, Serial No. 134,338, and in Germany September 18, 1925.

Our present invention relates to an improved method of preparing acid-proof cementing or lining compositions for lining iron vessels or the like.

Hitherto acid-proof linings of iron vessels have been obtained by covering the inside of these vessels with acid-proof stones, small porcelain slabs or similar material, the adherence of the stones to the walls of the vessels and the tightening of the joints being effected by means of a cement prepared from water-glass. However the cementing and lining compositions hitherto used were unsatisfactory in so far as the thermal conductibility of these compositions differs too much from that of the external metal-vessels. Therefore variations of temperature, as they occur for instance when heating the vessels, cause different degrees of expansion so that the hardened cementing mass becomes fissured at the joints whereby the lining is very quickly destroyed.

Now we have found that by adding pulverized (amorphous or crystalline) silicon to the powdered materials hitherto used for preparing the water-glass cements, acid-proof compositions are obtained, which are eminently suitable both for use as a cement powder and for the manufacture of lining-slabs or for lining the vessels directly.

The known water glass compositions to which silicon may be added in accordance with the invention are described by Ullmann, Enzyklopädie der Technischen Chemie, vol. 7, page 16, as comprising mixtures of water glass with siliceous materials such as glass or ceramic compositions, asbestos powder, chalk, marble powder and the like.

The compositions thus prepared are absolutely fast to the action of all acids with the exception of hydrofluoric acid; they harden considerably quicker than the cement mixtures hitherto used, even without being exposed to heat, their thermal conductibility, approaching that of metals, renders them more stable against the influence of variations of temperature. Moreover, our new compositions are by far harder and possess a greater adhering-power than the cements hitherto used. Thus, vessels lined with one of the hitherto used cementing-compositions withstood only three operations of a certain kind (owing to variations of temperature between $-20°$ C. and $+140°$ C. during the operations and a pressure of 2,5 At. and a high temperature when pressing off) whereas vessels lined with our new compositions were in constant use for 8 months without being deteriorated and endured under the same conditions a great many more operations than the vessels lined with the compositions hitherto used. It has proved advantageous to use for the preparation of new acid-proof cementing or lining compositions besides silicon such materials as possess a particularly high reactivity towards the alkalis, such as for instance opal, chalcedony, flint-stone, siliceous sinter or the like (according to the process described in our pending U. S. patent application Ser. No. 125,325 filed 29th July 1926).

The described properties of the new acid-resistant masses are based on the fact that the silicon is an active component of the powdered materials which are used in the preparation of the water-glass cement and reacts strongly with the water-glass. This reaction is explained by the known reaction of silicon with alkalis. In this reaction between silicon and alkali silicic acid or silicate are formed, which cause the rapid hardening of the acid resistant masses. The addition of silicon compounds, such as opal, chalcedony, flint-stone, etc., rests on the same principle. The proportion in which silicon is to be added to the cement mixture depends on the heat conductivity which is desired and on the cost at which the cement mixture must be produced. A cement mixture containing much silicon would have high heat conductivity but would be very expensive. For purposes where only a rapid hardening of the cement is required but a high heat conductivity is not demanded, a relatively small addition of silicon is sufficient.

The proportion of total solids to water glass will, of course, be adjusted to give the desired consistency for proper working.

We have furthermore found that pure densely-fused silicon metal is also suitable for the preparation of the acid-proof cementing compositions in question. Slabs made by this way possess also a good thermal conductibility and are absolutely acid-proof.

We claim:

1. The process for preparing acid-proof compositions which comprises adding pulverized silicon to a water-glass cement.

2. As new products acid-proof compositions consisting of pulverized silicon and a water-glass cement.

3. As new products acid-proof molded bodies consisting of pulverized silicon and a water-glass cement.

In testimony whereof, we affix our signatures.

KARL FRANK.
KARL DIETZ.